July 16, 1946.     W. KOENIG, JR., ET AL     2,403,984
REPRESENTATION OF COMPLEX WAVES
Filed April 3, 1945     3 Sheets-Sheet 1
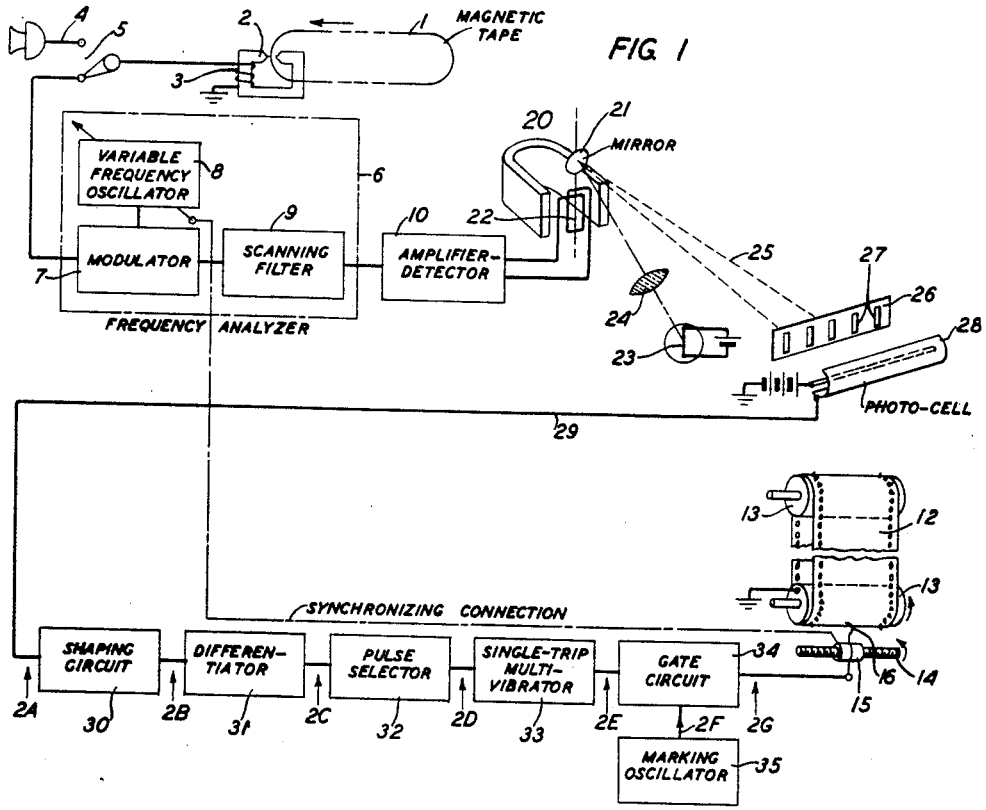
FIG. 2
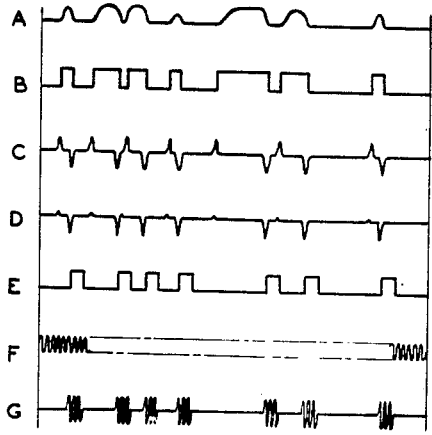
FIG. 4
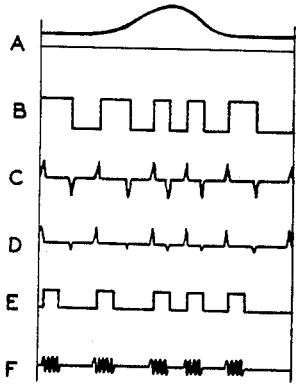
INVENTORS
W. KOENIG, JR.
A. E. RUPPEL
BY
N. A. Ewing
ATTORNEY July 16, 1946.   W. KOENIG, JR., ET AL   2,403,984
REPRESENTATION OF COMPLEX WAVES
Filed April 3, 1945   3 Sheets-Sheet 2
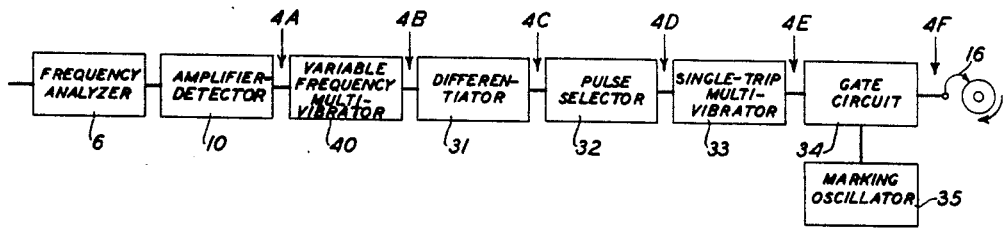
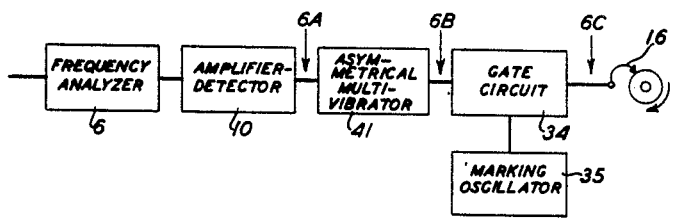
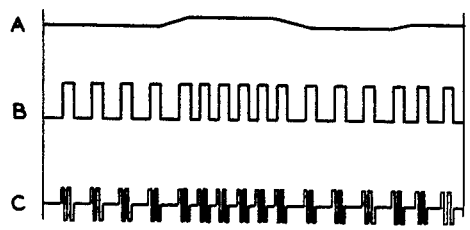
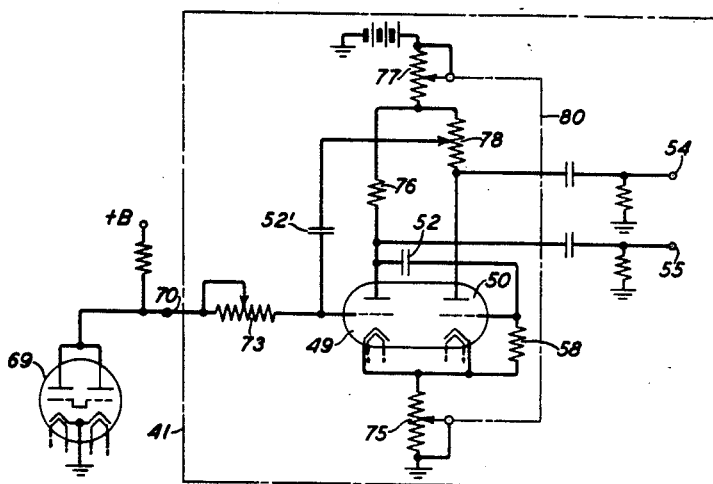
INVENTORS
W. KOENIG, JR.
A. E. RUPPEL
BY
N. A. Ewing
ATTORNEY July 16, 1946.  W. KOENIG, JR., ET AL  2,403,984
REPRESENTATION OF COMPLEX WAVES
Filed April 3, 1945  3 Sheets-Sheet 3
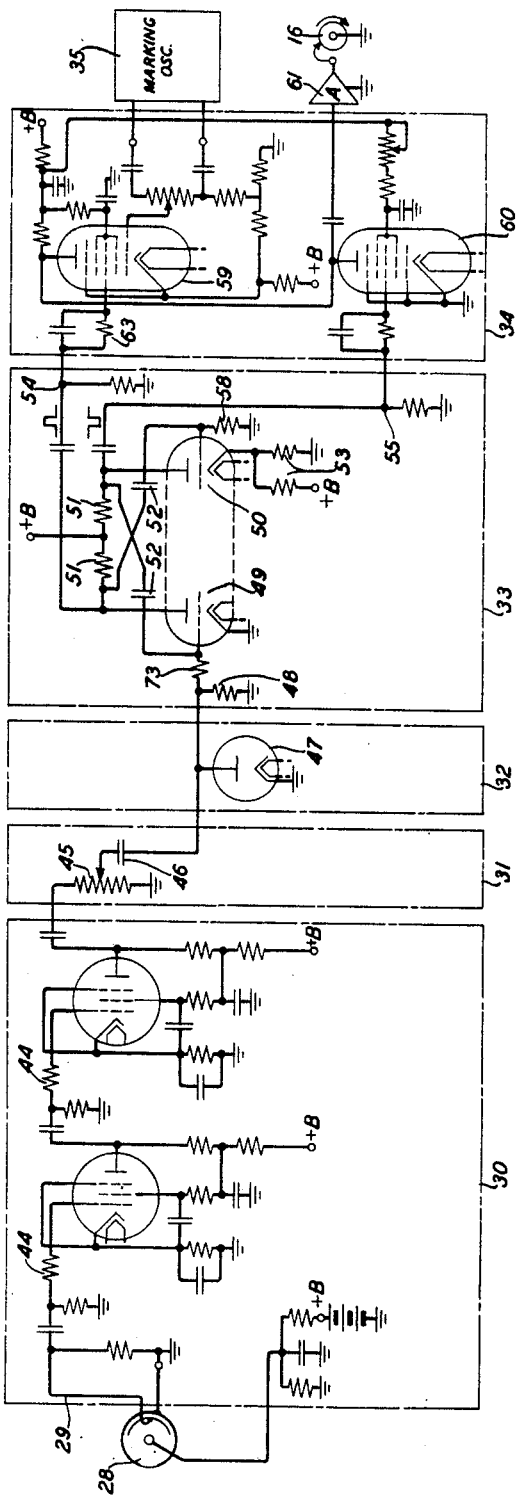
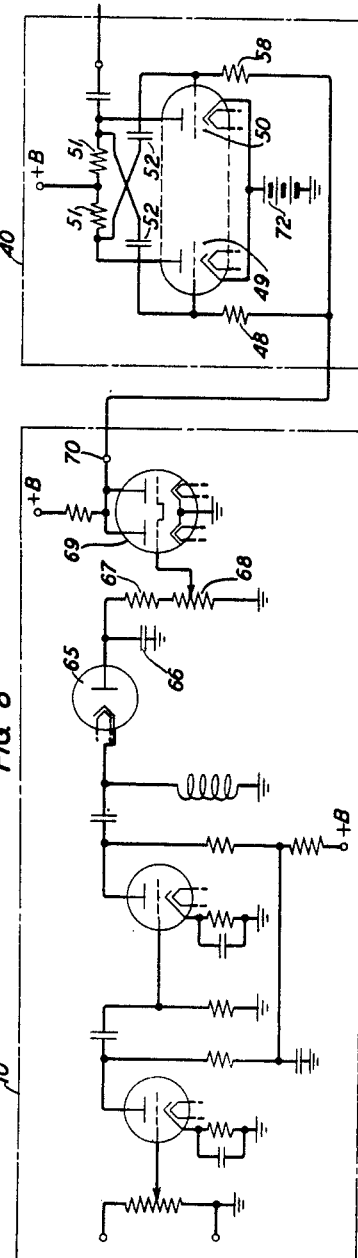
INVENTORS
W. KOENIG, JR.
A. E. RUPPEL
BY
N. D. Ewing
ATTORNEY Patented July 16, 1946

2,403,984

UNITED STATES PATENT OFFICE 2,403,984

REPRESENTATION OF COMPLEX WAVES

Walter Koenig, Jr., Clifton, N. J., and Alfred E. Ruppel, Queens Village, N. Y., assignors to Bell Telephone Laboratories, Incorporated, New York, N. Y., a corporation of New York Application April 3, 1945, Serial No. 586,309

8 Claims. (Cl. 179—1)

This invention relates to the analysis of complex waves and more particularly to the production of complex-wave spectrograms.

Heretofore it has been proposed to record complex waves, such as speech waves, for example, in the form of a spectrogram or pattern, the dimensions of which have the sense of coordinate axes representing frequency and time respectively, and in which each point on the record surface is identified with a particular frequency component, or component frequency band, and also with a particular time. The pattern may be formed of a multiplicity of small discrete marks, differently spaced according to the varying envelope amplitude or effective intensity of the several components. Such spectrograms are disclosed in the copending application of R. K. Potter, Serial No. 569,557, filed December 23, 1944.

One object of the present invention is to facilitate accurate quantitative interpretation of a spectrogram of the kind described.

Another and more particular object is to produce a spectrogram of the kind described in which the aforesaid discrete marks are sharply defined, accurately spaced and of uniform size.

A further object is to produce a complex-wave spectrogram in which the envelope amplitude or effective intensity of the wave components in any particular frequency band is indicated accurately by the separation of uniform small dots.

Still another object is to produce a spectrogram comprising contour lines of insubstantial uniform width.

In a speech spectrograph embodying the present invention and hereinafter described in detail the variation in envelope amplitude of any selected wave component gives rise to a series of ill-defined current pulses, variable in intensity, duration and separation, which are translated electrically into a series of bursts of alternating recording current that are sharply defined, uniform in intensity and duration and separated accurately according to the separation of predetermined points in the several current pulses. In another embodiment of the invention the variation in envelope amplitude of the selected component controls an operating characteristic of a multivibrator, the wave output of which is utilized or further operated upon to control the application of alternating current to the recorder.

The nature of the present invention and its various features, objects and advantages will appear more fully on consideration of the embodiments illustrated in the accompanying drawings and hereinafter to be described.

In the drawings:

Fig. 1 illustrates a complex-wave spectrograph or analyzing and recording system in accordance with the invention;

Figs. 3 and 5 illustrate modifications of the Fig. 1 system;

Figs. 2, 4 and 6 illustrate certain details of the operation of the systems shown in Figs. 1, 3 and 5 respectively; and Figs. 7, 8 and 9 illustrate schematically certain circuit details of the systems shown in Figs. 1, 3 and 5 respectively.

Referring more particularly now to the system illustrated in Fig. 1, there is provided a magnetic recorder-reproducer represented by an endless magnetic tape 1 that passes continuously at a constant speed between the pole-pieces 2 of an electromagnet comprising a coil 3. The complex waves of which a pattern is to be formed may be speech-bearing waves, for example, received from a microphone circuit 4 which can be connected at will to coil 3 by means of a two-position switch 5. With switch 5 in its upper operating position the waves arriving over circuit 4 are first recorded on the magnetic tape 1 and the switch is then opened. Thereupon the recorded waves are electrically reproduced or played back repeatedly, once for every complete revolution or cycle of movement of the tape 1.

The waves so reproduced are then applied, by moving switch 5 to its lower operating position, to a frequency analyzer or scanner 6 of the heterodyne type comprising a modulator 7 which is supplied with beating oscillations from an oscillator 8, and a band-pass or scanning filter 9 which is connected to receive the wave output from modulator 7. Modulator 7 effectively translates the applied band of speech-bearing waves to a higher position in the frequency range depending on the frequency of the beating oscillations, and the latter frequency is varied continuously from one limiting value to another such that the translated band progressively shifts in frequency position. The total shift of the band is comparable with its width. Scanning filter 9 has a relatively narrow pass-band, the mean frequency of which is such that as the translated band of waves shifts in frequency position filter 9 selects progressively different component frequency bands therefrom. In effect, the pass band of filter 9 moves gradually across the frequency range occupied by the speech-bearing waves and during each reproduction admits the wave components appearing in a different frequency band. The waves selected by filter 9 are supplied to an amplifier-detector 10, the constants of which are so chosen that the unidirectional voltage appearing at its output terminals varies relatively slowly in conformity with the variations in envelope amplitude of the wave components selected by the frequency analyzer.

Synchronized with the operation of the analyzer 6 is a recorder which is illustrated diagrammatically in Fig. 1 as comprising an endless belt of facsimile paper 12 that is driven continuously at constant speed over a pair of drums 13. On a rotating threaded shaft 14 rides an insulated traveling nut 15 which supports a stylus 16 in light contact with the sensitized face of the paper 12. The latter may be dry facsimile paper, preferably one with a titanium-oxide coating and carbon backing such as the "Teledeltos Grade H" facsimile paper developed by the Western Union Telegraph Company. Stylus 16, which may be a stainless steel wire 10 mils in diameter for specific example, is driven slowly and continuously across the paper, i. e., longitudinally of the drum 13, in the course of production of a spectrogram. Whenever marking current is supplied to the stylus 16 it passes from the stylus through the facsimile paper to the underlying drum 13 which provides a return current path. By virtue of the current passing through the point of contact of stylus 16 a chemical change takes place and a mark is made on the paper.

The progressive change in the operating frequency of oscillator 8 is electrically or mechanically geared, by means of any suitable synchronizing connection, with the progressive change in the position of stylus 16 so that as the stylus moves once across the facsimile paper the oscillator frequency progresses from its one limiting value to the other. The latter operation is completed only after many revolutions or cycles of movement of the belt 12. In one instance in practice, for example, in which a 3500-cycle band of speech waves was to be recorded on a belt 12 about two inches wide, the parts were so arranged that the waves were reproduced two hundred times while the stylus moved across the paper.

Disregarding the slight change in the frequency of oscillator 8 that takes place during each reproduction of the speech waves and the corresponding slight change in the frequency band selected by filter 9, it will be understood that during each reproduction of the recorded waves the filter 9 selects a definite predetermined frequency band while the stylus 16 traverses a respectively corresponding path substantially longitudinally of the facsimile paper.

In the Fig. 1 system the mark made by stylus 16 while traversing any longitudinal path on the facsimile paper 12 is varied under the control of the unidirectional voltage derived from the respectively corresponding frequency band. The control elements include a mirror galvanometer 20 comprising a mirror 21 that is supported for limited rotation about a vertical axis, and a driving coil 22 which is connected to receive the unidirectional voltage from amplifier-detector 10. A beam of light is directed to the mirror 21 by means of an incandescent lamp 23, which has a vertical filament, and an optical system symbolized by lens 24. The light beam 25 reflected from the mirror 21 sweeps, under the control of the unidirectional voltage, along an opaque mask 26 that has a multiplicity of transverse slits 27 spaced apart therein. Whenever the envelope amplitude passes through any of several predetermined discretely different values, the beam 25 passes through a respectively corresponding slit 27 to an elongated photoelectric cell 28 that is aligned with mask 26. In the output circuit 29 of photoelectric cell 28 there appears, in the course of operation, a succession of unidirectional current pulses each marking the passage of the envelope amplitude through one or another of the aforesaid discrete values.

As shown at A in Fig. 2 the current pulses in circuit 29 are generally of irregular shape and vary in length, intensity and spacing. A shaping circuit 30 to which the pulses are applied converts them into rectangular pulses that have the same length and spacing as before but that are of constant amplitude, as shown at B in Fig. 2. By virtue of the rectangular shape the beginning and the end of each shaped pulse are sharply defined. The shaped pulses are then applied to a differentiator 31 which produces an extremely sharp pulse of insignificant length at the beginning and end of each shaped pulse. As shown at C in Fig. 2 these sharp pulses alternate in relative polarity. Pulse selector 32 operates to suppress the pulses of one polarity thereby leaving only pulses which sharply mark either the beginning or the end of the original pulses shown at A in Fig. 2. Thus the selected pulses illustrated at D in Fig. 2 mark the respective ends of the original unidirectional pulses.

The selected pulses are applied to a single-trip multivibrator 33 which has a natural frequency of 1500 cycles per second, for specific example. The characteristics of the single-trip multivibrator are such that each applied pulse causes it to execute a single half cycle, or trip, and in the absence of such a pulse it remains at rest, i. e., inoperative. The wave output of the multivibrator 33 comprises, as shown at E in Fig. 2, a succession of variably spaced rectangular lobes, all of exactly the same length, and each timed to coincide with the end of one of the pulses appearing in circuit 29. The wave output of multivibrator 33 is applied to a gate circuit 34 which functions to release current from a marking oscillator 35 to stylus 16 so long as a voltage lobe, or pulse, is delivered by multivibrator 33. If the operating frequency of oscillator 35 is 12,000 cycles per second, for specific example, the marking current delivered to stylus 16 will comprise a succession of bursts of 12,000-cycle current, each 4 cycles or 0.00033 second in duration, and all of the bursts being of the same intensity. Each such burst produces on the facsimile paper 12 a small, black, well-defined dot. The wave outputs of marking oscillator 35 and gate circuit 34 are represented at F and G respectively, in Fig. 2, with the duration of the bursts exaggerated, as at E, for sake of clearance.

The dots produced in the successive paths along the facsimile paper 12 align themselves to form contour lines each representing one of the predetermined different values of envelope amplitude. The width of each such contour line is that of a single dot, for only a single dot and neither a succession of dots nor an elongated line is produced regardless of how long the beam 25 may happen to dwell on one of the slits 27.

Circuit details appropriate for elements 30 to 34 of the Fig. 1 system are illustrated schematically in Fig. 7. The shaping circuit 30 shown in Fig. 7 comprises a two-stage resistance-condenser coupled amplifier in which large resistors 44 interposed in the two control-grid circuits limit the amplitude of the amplified output pulses (Fig. 2B) to a substantially constant value. By virtue of the amplifying and limiting process the pulses applied to potential divider 45 of differentiator circuit 31 are substantially rectangular in shape. The contactor of the potential divider 45 is connected through a condenser 46, having a capacitance of a few micromicrofarads, to the ungrounded output terminal of the circuit. The several circuit elements are so proportioned as to produce in effect a differentiation of the rectangular wave, evidenced by sharp output pulses that are alternately positive and negative. A thermionic diode 47 shunted across the circuit passing through pulse selector 32 substantially limits the positive pulses so that only negative pulses of any appreciable amplitude are applied to the input circuit of multivibrator 33.

Multivibrator 33 comprises two thermionic triode sections 49 and 50 which have individual anode circuit resistors 51 connected to a common anode voltage source and a pair of condensers 52 individually connecting the anodes of each triode section to the grid of the other. The negative pulses derived from circuit 32 are applied across a resistor 48 one terminal of which is grounded and the other terminal of which is connected to the grid of triode section 49 through a resistor 73 which may have a resistance of about a half megohm. The grid of triode section 50 is connected to ground through a resistor 58, which like resistor 48 may have a resistance of several megohms. A small fraction of the anode supply voltage is introduced between the cathode of triode section 50 and ground, by means of potential dividing resistors 53, to bias the grid thereof negatively with respect to the cathode. The multivibrator is designed to have a natural period of 0.00066 second, but the bias is sufficient to maintain it normally in an inoperative or rest condition. Each of the negative pulses received at the grid of triode section 49 initiates a half cycle of operation, i. e., it switches the multivibrator to an unstable condition where it remains for 0.00033 second before switching back to its stable or rest condition. This switching operation produces at each of the anodes a rectangular voltage pulse of 0.00033 second duration, the two pulses being simultaneous and of mutually opposite polarity. The pulses appearing at the two anodes are transmitted through individual blocking condensers to respective output terminals 54 and 55.

Gate circuit 34 shown in Fig. 7 comprises a pair of amplifying vacuum tubes 59, 60, which may be of the type 6L7. Tube 59 is normally non-conducting by virtue of a large grid biasing voltage effectively interposed in its cathode-to-ground lead. Marking oscillator 35 is connected through a potential divider to one of the control grid circuits of the tube 59. Pulses of positive polarity from multivibrator output terminal 54 are applied through a condenser-shunted current-limiting resistor 63 to another control grid of tube 59, the shunting condenser being so proportioned with respect to the inherent shunt capacitance as to insure fast operation. The anode of tube 59 is connected through a blocking condenser and an amplifier 61 to stylus 16. So long as a pulse is applied, tube 59 is conducting and the marking oscillations applied thereto are amplified and delivered to the stylus 16.

Tube 60, which is normally conducting, is connected in the same manner as tube 59 to the other output terminal 55 of multivibrator 33 so that it receives a negative voltage pulse on one of its control grids whenever and so long as tube 59 receives a positive pulse. The anode of tube 60 is connected directly to the anode of tube 59 and the circuit constants are so proportioned that the space current taken by the one changes equally and oppositely with that taken by the other. The latter feature obviates difficulties that would be caused by step changes in the output current of the gate circuit. The output current delivered to stylus 16, therefore, consists of a succession of four-cycle bursts of 12,000-cycle current, the bursts being constant in both duration and amplitude and timed to substantially coincide with the succession of pulses from photoelectric cell 28.

In the modification of the invention that is illustrated diagrammatically in Fig. 3, the optical elements of Fig. 1 are omitted and the fluctuating unidirectional voltage delivered by amplifier-detector 10 is applied directly to control the operating frequency of a multivibrator 40. The latter continuously generates a symmetrical rectangular wave, the frequency of which is widely variable and increases continuously with continuous increase in the voltage delivered by amplifier-detector 10. In normal operation of the Fig. 3 system, for specific example, the natural frequency of multivibrator 40 may range from 100 cycles per second for a low marginal value of applied voltage to 2,000 cycles per second for maximum values of applied voltage.

The varying control voltage derived from amplifier-detector 10, which conforms with the variations in envelope amplitude, is illustrated at A in Fig. 4; and at B is shown the voltage wave concurrently produced by multivibrator 40. Sharp positive and negative pulses, variably spaced in accordance with the varying frequency of the multivibrator, are produced by differentiator 31, as represented at C, and the negative pulses are suppressed by pulse selector 32. The positive pulses, represented at D in Fig. 4, are used to trip the single-trip multivibrator 33, the wave output of which is shown at E in Fig. 4. The multivibrator 33 in turn operates on gate circuit 34 which releases marking oscillations from oscillator 35 to stylus 16. The marking oscillations applied to the stylus 16 are, as shown at F in Fig. 4, in the form of four-cycle bursts of 12,000-cycle current, the bursts being uniform in amplitude and spaced variably in conformity with the variations in envelope amplitude.

On the facsimile paper the marking current applied to stylus 16 produces a succession of uniform dots the spacing of which is an accurate measure of envelope amplitude; that is, the interdot spacing is an accurate measure of the envelope amplitude at the frequency and time indicated by the coordinate position of the dots. The relation between dot spacing and envelope amplitude may be linear or non-linear, or logarithmic specifically, depending on the relation between the operating frequency of multivibrator 40 and the variable control voltage applied thereto.

Circuit details appropriate for amplifier-detector 10 and multivibrator 40 are illustrated in Fig. 8. Amplifier-detector 10 may comprise, as shown, a two-stage resistance-condenser coupled amplifier the output circuit of which is shunted by a thermionic diode 65 in series with the parallel combination of a condenser 66 and the series-connected resistors 67 and 68. The detector circuit may be advantageously designed to have a time constant equivalent to a frequency of about 140 cycles per second, particularly if one desires to suppress the transverse striations that tend to appear in the spectrogram when the band width of the scanning filter is as great as the fundamental voice frequency. For this purpose condenser 66 may have a capacitance of 0.65 microfarad and elements 67 and 68 may have a resistance of 10,000 ohms and 1,000 ohms respectively, where diode 65 comprises both sections of a type 6H6 tube. The voltage appearing across all or part of resistor 68, which may comprise a potential divider as shown, is applied to a single-stage direct-current amplifier comprising triode 69. The latter may be of the type 6SL7. The voltage appearing at the anode-connected output terminal 70 of tube 69 is positive with respect to ground and, with diode 65 poled as shown, it varies in value from a steady minimum value that obtains when the envelope amplitude is zero.

In multivibrator 40, as shown in Fig. 8, the low potential ends of the two grid resistors 48 and 58 are connected together to the amplifier output terminal 70, and the cathodes of the two triode sections 49 and 50 are connected together through a biasing battery 72 to ground, that is, to the other side of the amplifier output circuit. The biasing voltage derived from battery 72 opposes that derived from the amplifier output circuit and it is great enough, but not substantially greater than necessary, to prevent operation of the multivibrator when the envelope amplitude is zero. When the envelope amplitude barely exceeds a predetermined threshold value the multivibrator begins to oscillate at its natural frequency, which is dependent on the time constant of its grid to anode coupling circuits. As the control voltage derived from amplifier-detector 18 increases from its corresponding threshold value the frequency of the multivibrator increases in substantially direct proportion. The threshold values may be changed either by changing the voltage of source 72 or by adjusting potential divider 68.

In accordance with a further modification of the invention illustrated diagrammatically in Fig. 5, the variable frequency multivibrator 40 and elements 31, 32 and 33 of the Fig. 3 system are replaced by a single asymmetrical multivibrator 41 that operates directly into the gate circuit 34. Multivibrator 41 is of such design that one rectangular lobe or semi-period of each cycle is of invariable length while the length of the other varies in conformity with the variations in envelope amplitude. The successive lobes of invariable length therefore vary in spacing in conformity with the variations in envelope amplitude, and they are utilized to release marking current through gate circuit 34 to stylus 16 in correspondingly spaced bursts of equal length. The bursts of marking current produce variably spaced uniform dots on the facsimile paper in the manner described with reference to Fig. 3.

Referring to Fig. 9 which shows circuit details of the multivibrator 41, the variable control voltage appearing at the output terminal 70 of amplifier tube 69 is applied through an adjustable resistor 73 of several megohms to the grid of triode section 49. The grid of triode section 50 is connected through grid resistor 58 to the cathode thereof which, together with the cathode of section 49, is grounded through an adjustable resistor 75. The anode of section 49 is connected to the grid of section 50 through condenser 52 and it is connected to the anode voltage source through the series combination of a fixed resistor 76 and an adjustable resistor 77. The anode of section 50 is connected through the resistor element of a potential divider 78, which has the same resistance as resistor 76, and thence through adjustable resistor 77 to the anode voltage source. Resistors 75 and 77 have a common control 80 such that their combined resistance is maintained at a constant value, which may be twenty thousand ohms as in one instance in practice. The contactor of potential divider 78 is connected to the grid of section 49 through a condenser 52', the capacitance of which is substantially different from that of condenser 52; its capacitance may be two thousand micromicrofarads and that of condenser 52 twenty micromicrofarads, for example. The anode of section 50 is connected also through a blocking condenser to output terminal 54 and the other anode is similarly connected to output terminal 55.

In the operation of multivibrator 41 there appears at the anode of section 49, superposed on a constant voltage component, a periodic voltage wave comprising successive rectangular lobes that are alternatively positive and negative in relative polarity. The lobes of negative polarity are of invariable length and uniform in amplitude; the positive lobes are of the same uniform amplitude and of a generally different, variable length. Hence, the periodic wave is variable with respect to both frequency and dissymmetry ratio, i. e., the ratio of the length of one lobe or semi-period in a given cycle to the length of the other lobe or semiperiod. At the anode of section 50 there appears a periodic wave that is of the same character except that its lobes are of opposite relative polarity. The latter wave, as it appears at terminal 54 with the constant voltage component removed, is represented at B in Fig. 6 in relation to the varying control voltage represented at A.

The length of the invariable lobe, which is equivalent to several cycles of the 12,000-cycle marking current, is fixed by condenser 52 and resistor 58. The length of the variable lobe depends markedly on the control voltage that is introduced between the grounded terminal of resistor 75 and grid resistor 73, and it is dependent also on the value of resistor 73, and on the setting of potential divider 78 and that of the adjustable resistor pair 75—77. The frequency at which the multivibrator oscillates when the control voltage is just barely high enough to permit oscillations, or in other words the length of the variable lobe at the threshold value of control voltage, is adjustable by means of resistor 73 which is effectively in series in the charging circuit of condenser 52'. Potential divider 78 affects the sensitivity of the oscillation frequency to changes in the control voltage. Moving its contactor to increase the resistance between contactor and the anode voltage source increases the charge on condenser 52' and thereby makes the length of the variable lobe less sensitive to the variations of the control voltage. Conversely, if the contactor is moved in the opposite direction a relatively large change in the length of the lobe is produced by a given change in the control voltage. Potential divider 78 thus controls the slope of the curve that depicts the relation between control voltage and either the spacing of current bursts or the dot spacing.

The aforesaid threshold value of control voltage may be adjusted by changing the value of resistor 75 and thereby changing the voltage drop that appears across it. The concurrent adjustment of resistor 77 obviates the change in the potential of the two anodes and the change in slope or sensitivity that would otherwise result. To overcome a tendency for contour lines to appear in the spectrogram in some cases, the resistors 75—77 may be so adjusted that the multivibrator oscillates continuously at a low frequency when the envelope amplitude is zero.

It will be understood that the several embodiments of the invention herein described are in some respects only illustrative and that the invention is susceptible of embodiment in various other forms within the spirit and scope of the appended claims.

What is claimed is:

1. A system for producing a spectrogram of complex waves comprising means for storing the said waves, means for reproducing the stored waves repeatedly in electrical form, means for deriving from the reproduced waves during each successive reproduction a control voltage that varies in magnitude substantially in conformity with the varying wave power content of a respective different frequency band, means responsive to said control voltage for producing a succession of electrical pulses variable spaced as a predetermined function of the varying magnitude of said control voltage, means actuated by said pulses for producing a correspondingly spaced succession of equilength bursts of alternating current, a record surface, stylus means movable relative to and across said surface along a different one of a multiplicity of collateral paths during respective different reproductions, and means for marking on said record surface including means for applying said bursts of alternating current to said stylus means.

2. A system in accordance with claim 1 in which said responsive means comprises means actuated during periods in which the said control voltage has any of a multiplicity of discretely different values, and means responsive to said last-mentioned means and actuated at one extremity of each such period.

3. A system in accordance with claim 1 in which said responsive means includes a multivibrator the operating frequency of which is variable under the control of said varying control voltage.

4. A system in accordance with claim 1 in which said responsive means includes a multivibrator only one semiperiod of which is variable in length under the control of said varying control voltage.

5. In combination with means for storing complex waves, means for repeatedly reproducing the stored waves, means for deriving from the reproduced waves during each of successive reproductions a control voltage that varies in amplitude in substantial conformity with the variations in effective intensity of the wave components appearing in a respective different frequency band, means for generating a periodic rectangular voltage wave in which the voltage lobes of one polarity are of substantially constant length and the voltage lobes of relatively opposite polarity are of a variable length dependent on the magnitude of said control voltage, current-responsive stylus marking means movable along a different preassigned path on a record surface during each of said successive reproductions, and means for applying marking current to said stylus marking means only during the recurrent intervals in which said lobes of substantially constant length appear.

6. A combination in accordance with claim 5 in which said generating means comprises a multivibrator, said multivibrator having voltage-responsive means for varying the length of the lobes of the said relatively opposite polarity independently of the length of the lobes of the said one polarity, and means for applying said control voltage to said voltage-responsive means.

7. In combination, means for generating a periodic asymmetric voltage wave comprising a multivibrator having voltage-responsive means for varying the length of the voltage lobes of one polarity independently of the length of the voltage lobes of relatively opposite polarity, means for applying to said voltage-responsive means a control voltage of varying magnitude whereby the length of the lobes of said one polarity is varied, a source of electrical oscillations, a load, a voltage-operated gate circuit connecting said source and said load, and means for operating said gate circuit intermittently to release said oscillations to said load intermittently comprising means for operating said gate circuit under the control of said periodic asymmetric voltage wave.

8. A combination in accordance with claim 7 in which said load comprises an electrically conductive stylus movable relative to and across a sensitized record surface, said gate circuit being operatively responsive only to the said lobes of said relatively opposite polarity.

WALTER KOENIG, Jr.
ALFRED E. RUPPEL.